United States Patent
Orimoto

(10) Patent No.: US 8,854,432 B2
(45) Date of Patent: Oct. 7, 2014

(54) MULTI-LENS CAMERA AND CONTROL METHOD

(75) Inventor: Masaaki Orimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1052 days.

(21) Appl. No.: 12/887,134

(22) Filed: Sep. 21, 2010

(65) Prior Publication Data

US 2011/0069151 A1 Mar. 24, 2011

(30) Foreign Application Priority Data

Sep. 24, 2009 (JP) ................................ 2009-218771

(51) Int. Cl.
H04N 13/02 (2006.01)
G03B 35/00 (2006.01)
(52) U.S. Cl.
CPC ............ H04N 13/0239 (2013.01); G03B 35/00 (2013.01); H04N 13/0246 (2013.01)
USPC .......................................................... 348/47
(58) Field of Classification Search
USPC .................................................... 348/42, 47
IPC ...................................................... H04N 13/02
See application file for complete search history.

(56) References Cited

U.S. PATENT DOCUMENTS

| 7,102,686 | B1 | 9/2006 | Orimoto et al. |
| 7,667,768 | B2 | 2/2010 | Orimoto et al. |
| 2006/0268159 | A1 | 11/2006 | Orimoto et al. |

FOREIGN PATENT DOCUMENTS

| JP | 06-054349 A | 2/1994 |
| JP | 11-355624 A | 12/1995 |
| JP | 11027703 A | 1/1999 |
| JP | 2003-052058 A | 2/2003 |
| JP | 2004354257 A | 12/2004 |
| JP | 2006121229 A | 5/2006 |
| JP | 2006162991 A | 6/2006 |
| JP | 2006165894 A | 6/2006 |
| JP | 2007052060 A | 3/2007 |

OTHER PUBLICATIONS

Notification of Reasons for Refusal, dated Nov. 28, 2012, issued in corresponding JP Application No. 2009-218771, 6 pages in English and Japanese.

Primary Examiner — Young Lee
(74) Attorney, Agent, or Firm — Sughrue Mion, PLLC

(57) ABSTRACT

A dual lens camera for producing a three-dimensional image includes plural lens systems and a zoom mechanism. Initial correction data is constituted by a displacement vector of an amount and a direction of misalignment between plural images according to a superimposed state thereof for each of zoom positions of the lens systems. A vector detector, if a calibration mode is set, obtains a current displacement vector related to one first zoom position. A data processor outputs current correction data by adjusting the initial correction data according to the initial correction data and current displacement vector. If the current correction data is stored, a displacement vector is obtained from the current correction data according to a zoom position of the lens systems upon forming the plural images, to carry out image registration between the images according to the obtained displacement vector for producing the three-dimensional image.

11 Claims, 10 Drawing Sheets

| CORRECTION DATA | |
|---|---|
| W END | DISPLACEMENT VECTOR Mw |
| ZOOM POSITION 1 | DISPLACEMENT VECTOR M1 |
| ZOOM POSITION 2 | DISPLACEMENT VECTOR M2 |
| ZOOM POSITION 3 | DISPLACEMENT VECTOR M3 |
| ⋮ | ⋮ |
| ZOOM POSITION n | DISPLACEMENT VECTOR Mn |
| T END | DISPLACEMENT VECTOR Mt |

MULTI-LENS CAMERA AND CONTROL METHOD

BACKGROUND OF THE INVENTION

1. Field of the Invention

The present invention relates to a multi-lens camera and a control method. More particularly, the present invention relates to a multi-lens camera of which plural images are created with parallax, and misalignment between plural lens systems can be eliminated easily and exactly, and a control method for control of the same.

2. Description Related to the Prior Art

A dual lens camera as multi-lens camera for producing a three-dimensional image by combining plural images with parallax is known, and includes plural lens systems. To obtain the three-dimensional image of good quality in the dual lens camera, misalignment other than suitable parallax between the images should be suppressed in the lens systems. However, skew may occur with optical axes of the lens systems due to various reasons such as errors in dimensions of parts, errors in assembly and the like. The misalignment will occur unacceptably due to the skew of the optical axes. There have been a number of suggestions in the dual lens camera for preventing the misalignment of the plural images in occurrence of skew of the optical axes of the lens systems.

In JP-A 2003-052058, image registration for the images is disclosed in which positions of reading the images are adjusted according to a displacement amount between a center of an image pickup device and a center of the optical axes of the lens systems, to read only positions corresponding between the images. In JP-A 6-054349, a mechanism for shifting the optical axes is disclosed to adjust a direction of the optical axes in the lens systems in relation to an elevation angle direction, azimuthal angle direction, and horizontal direction. Image registration is carried out for the images by regulating the optical axes of the lens systems by the shifting mechanism. In U.S. Pat. Nos. 7,102,686 and 7,667,768 (corresponding to JP-A 11-355624), a cross shaped key is used to input information of a direction and amount of shift finely to adjust the position and angle of the images. Limited portions are retrieved from image frames of the images according to the direction and amount of the shift, to remove the misalignment for the image registration.

A zoom mechanism is additionally incorporated in each of the lens systems. An amount of correcting the misalignment is different according to a zoom position (focal length) of the lens systems. It is necessary to carry out image registration by adjustment for each of the zoom positions of the lens systems in the structure with the zoom mechanism in the lens systems, to complicate the operation excessively.

Generally, a manufacturer of the dual lens camera carries out the image registration in the manufacture to suppress the misalignment of plural images. Among numerous users or operators purchasing the dual lens camera, somebody may be unfamiliar to manual handling of mechanical parts, and will not carry out the image registration successfully by himself or herself. However, the image registration on the side of the manufacturer is suitable for the user of the dual lens camera to use the dual lens camera easily and sufficiently to obtain the three-dimensional image without noticing the misalignment of the plural images.

However, an accident may occur to give extraordinary shock to the dual lens camera typically when the user drops or strikes the dual lens camera. The misalignment is likely to occur with images as the optical axes of the lens systems may skew no matter how exactly the dual lens camera has been conditioned and adjusted by the manufacturer. If a user or operator uses the dual lens camera during a trip or under other unfamiliar conditions, it is very difficult to have the manufacturer to repair the dual lens camera. It is preferable practically for the user to correct the misalignment of the images by readjustment for image registration. The image registration with difficulties is not acceptable so that he or she may give up in continuous use of the dual lens camera. Also, difficult operation for the image registration will result in failure to cause the misalignment to remain after the readjustment. There is no suggestion of correcting the misalignment of the images by readjustment easily to end users who may be unskilled in mechanical operation.

SUMMARY OF THE INVENTION

In view of the foregoing problems, an object of the present invention is to provide a multi-lens camera of which plural images are created with parallax, and misalignment between plural lens systems can be eliminated easily and exactly, and a control method for control of the same.

In order to achieve the above and other objects and advantages of this invention, a multi-lens camera for producing a three-dimensional image from plural images with parallax is provided, and includes plural lens systems for receiving entry of object light to form the plural images. A zoom mechanism changes a magnification of each of the lens systems within a zooming range. A first correction data memory stores initial correction data constituted by a displacement vector of an amount and a direction of misalignment between the plural images according to a superimposed state thereof for each of zoom positions of the lens systems. A mode designation device sets a calibration mode for adjusting the initial correction data. A vector detector, if the calibration mode is set, obtains a current displacement vector between the plural images in relation to one first zoom position. A data processor outputs current correction data by adjusting the initial correction data according to the initial correction data and the current displacement vector. A second correction data memory stores the current correction data. An image registration processor, if the current correction data is absent in the second correction data memory, obtains a displacement vector from the initial correction data according to a zoom position of the lens systems upon forming the plural images, and if the current correction data is stored in the second correction data memory, obtains a displacement vector from the current correction data according to a zoom position of the lens systems upon forming the plural images, to carry out image registration between the plural images according to the obtained displacement vector for producing the three-dimensional image.

The data processor obtains the displacement vector in association with the first zoom position from the initial correction data, to constitute the initial displacement vector, determines a first difference amount between the initial displacement vector and the current displacement vector, determines a second difference amount in association with one second zoom position according to the first difference amount and a ratio between focal lengths in relation to respectively the first and second zoom positions, obtains a second initial displacement vector in association with the second zoom position from the initial correction data, and determines a sum of the second difference amount and the second initial displacement vector, to constitute the current correction data in relation to the second zoom position.

Furthermore, a zoom control device drives the zoom mechanism in response to setting of the calibration mode, to set the lens systems in a telephoto end position for a zoom position.

The image registration processor determines an overlap region where the plural images overlap on one another according to the obtained displacement vector, for the image registration by retrieving the overlap region from the plural images.

Furthermore, a display panel displays the plural images in the superimposed state. The vector detector is externally operable to input a signal for shifting one of the plural images in one direction. An amount and direction of shift of the shifted image are determined for the current displacement vector upon registering a common object in the plural images on the display panel.

The second correction data memory is accessed to rewrite the current correction data determined newly at each time of setting the calibration mode.

Also, a control method of controlling a multi-lens camera is provided, the multi-lens camera including plural lens systems for receiving entry of object light to form plural images with parallax, and a zoom mechanism for changing a magnification of each of the lens systems within a zooming range, so as to produce a three-dimensional image from the plural images. In the control method, a displacement vector of an amount and a direction of misalignment between the plural images according to a superimposed state thereof is obtained for each of zoom positions of the lens systems, to store initial correction data. If a calibration mode is set for adjusting the initial correction data, a current displacement vector in relation to one first zoom position is obtained. Current correction data is output by adjusting the initial correction data according to the initial correction data and the current displacement vector. The current correction data is written to a correction data memory. If the current correction data is absent in the correction data memory, a displacement vector is obtained from the initial correction data according to a zoom position of the lens systems upon forming the plural images, and if the current correction data is stored in the correction data memory, a displacement vector is obtained from the current correction data according to a zoom position of the lens systems upon forming the plural images, to carry out image registration between the plural images according to the obtained displacement vector for producing the three-dimensional image.

The step of outputting the current correction data includes obtaining the displacement vector in association with the first zoom position from the initial correction data, to constitute the initial displacement vector. A first difference amount between the initial displacement vector and the current displacement vector is determined. A second difference amount in association with one second zoom position is determined according to the first difference amount and a ratio between focal lengths in relation to respectively the first and second zoom positions. A second initial displacement vector in association with the second zoom position is obtained from the initial correction data. A sum of the second difference amount and the second initial displacement vector is determined, to constitute the current correction data in relation to the second zoom position.

Furthermore, the zoom mechanism is driven in response to setting of the calibration mode, to set the lens systems in a telephoto end position for a zoom position The step of the image registration includes determining an overlap region where the plural images overlap on one another according to the obtained displacement vector. The image registration is carried out by retrieving the overlap region from the plural images.

The step of initially obtaining the displacement vector includes obtaining displacement vectors of the lens systems when the lens systems are set in a telephoto end position and a wide-angle end position. A displacement vector in relation to one intermediate zoom position is obtained according to the displacement vectors in relation to the telephoto and wide-angle end positions and ratios between focal lengths of the optical systems in the telephoto and wide-angle end positions and the intermediate zoom position thereof.

Also, a computer-executable program for controlling a multi-lens camera is provided, the multi-lens camera including plural lens systems for receiving entry of object light to form plural images with parallax, and a zoom mechanism for changing a magnification of each of the lens systems within a zooming range, so as to produce a three-dimensional image from the plural images. The computer-executable program includes an obtaining program code for obtaining a displacement vector of an amount and a direction of misalignment between the plural images according to a superimposed state thereof for each of zoom positions of the lens systems, to store initial correction data. An obtaining program code is for, if a calibration mode is set for adjusting the initial correction data, obtaining a current displacement vector between the plural images in relation to one first zoom position. An outputting program code is for outputting current correction data by adjusting the initial correction data according to the initial correction data and the current displacement vector. A writing program code is for writing the current correction data to a correction data memory. An obtaining program code is for, if the current correction data is absent in the correction data memory, obtaining a displacement vector from the initial correction data according to a zoom position of the lens systems upon forming the plural images, and if the current correction data is stored in the correction data memory, obtaining a displacement vector from the current correction data according to a zoom position of the lens systems upon forming the plural images, to carryout image registration between the plural images according to the obtained displacement vector for producing the three-dimensional image.

Therefore, misalignment between the plural lens systems can be eliminated easily and exactly, because a step of image registration is determined selectively according to setting of a calibration mode.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
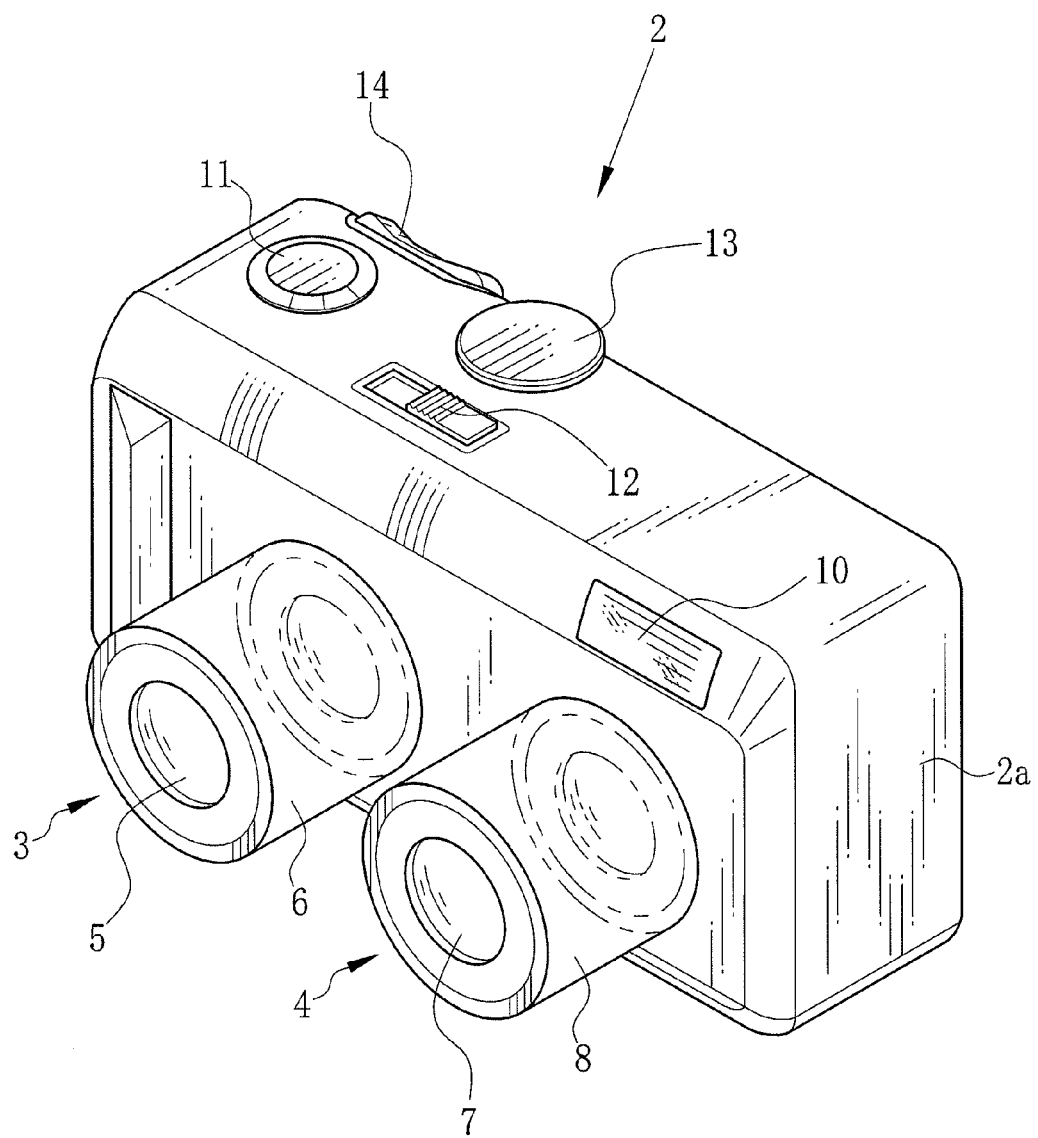
FIG. 1 is a perspective view illustrating a dual lens camera.

In FIG. 1, a dual lens camera 2 or multi-lens camera by way of stereoscopic camera or three-dimensional camera is illustrated, and includes a camera body 2a. A set of right and left camera units 3 and 4 are disposed on the camera body 2a. The right and left camera units 3 and 4 are so arranged that their front portions protrude from the front of the camera body 2a and their optical axes extend in parallel with one another. The dual lens camera 2 forms a pair of images with parallax by image pickup through the right and left camera units 3 and 4. The images are combined to produce a three-dimensional image.

The right camera unit 3 includes a first lens barrel 6, in which a first lens system 5 is incorporated. The left camera unit 4 includes a second lens barrel 8, in which a second lens system 7 is incorporated. The lens barrels 6 and 8, when the power source is turned off or at the time for reproducing an image, are moved back to a closed position contained in the camera body 2a as indicated by the phantom line, and at the time for image pickup, are moved forwards to a forward position protruding from the camera body 2a. A flash light source 10 is disposed in a front face of the camera body 2a for applying flash light to an object to illuminate.

Plural elements are disposed on an upper surface of the camera body 2a, including a shutter button 11, a power switch 12, and a mode designation wheel 13 as mode designation device. The shutter button 11 is depressed for recording an image. The power switch 12 is operable for turning on and off a power source. The mode designation wheel 13 is operable for setting a selected one of plural operation modes including a calibration mode. The modes include a still image mode, a moving image mode, a playback mode and the calibration mode. In the still image mode, the dual lens camera 2 forms a still image as a three-dimensional image. In the moving image mode, the dual lens camera 2 forms a moving image as a three-dimensional image. In the playback mode, the three-dimensional image is reproduced and displayed. In the calibration mode, the dual lens camera 2 obtains correction data for image registration of images from the right and left camera units 3 and 4 by image processing. The mode designation wheel 13 is rotationally movable for the mode selection.

In the still image mode, the shutter button 11 is depressed to record a three-dimensional image of an object in a still form.

In the moving image mode, the shutter button 11 is depressed to start recording a moving image, and is depressed again to stop the recording, to obtain the three-dimensional moving image.

Figure 2:
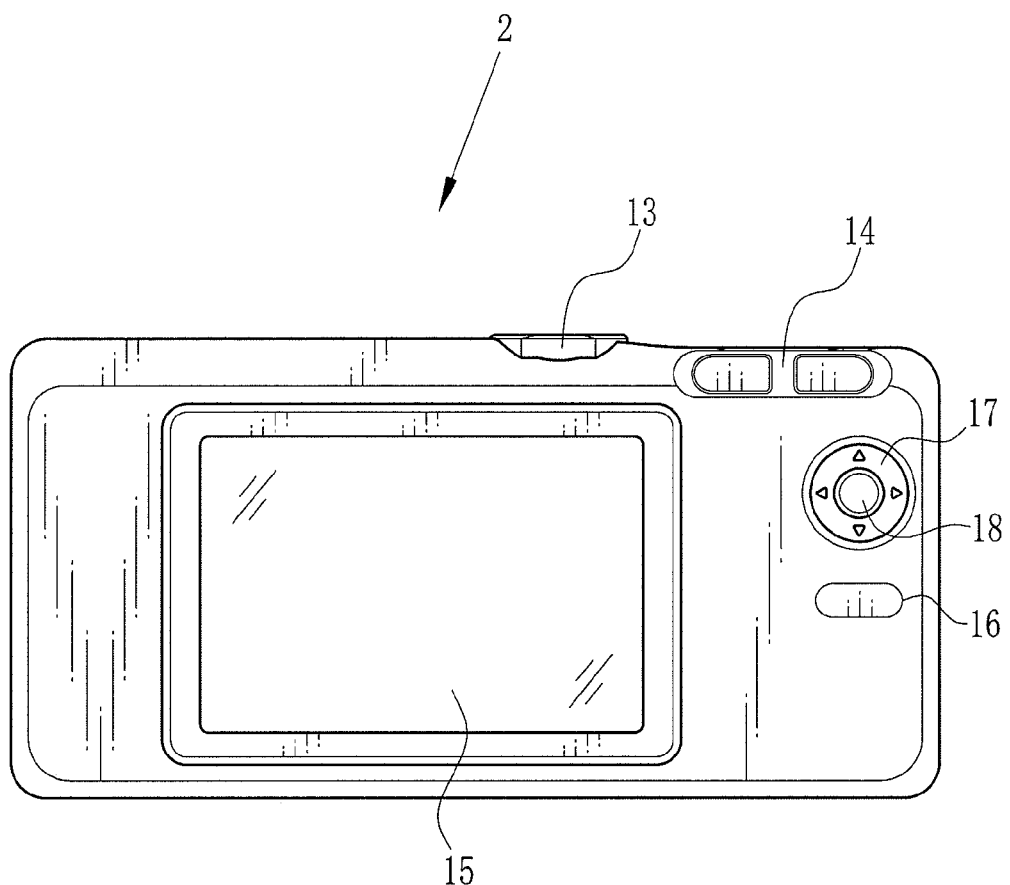
FIG. 2 is a rear elevation illustrating the dual lens camera.

In FIG. 2, various elements are disposed on a rear surface of the camera body 2a, including a zoom button 14, a display panel 15, a menu button 16, and a cross shaped key 17 as a vector detector. The zoom button 14 operates for zooming the lens systems 5 and 7 toward the telephoto and wide-angle end positions. The display panel 15 displays a three-dimensional image, a live image in a standby state, various menu screens and the like. The menu button 16 operates for display of the menu screens. The cross shaped key 17 operates for selecting a term or button inside the menu screen. A confirmation button 18 is disposed at the center of the cross shaped key 17 for confirming selected information or input information or signal.

The display panel 15 includes a lenticular lens on a front side, and is a three-dimensional display of an autostereoscopic type. A user or operator can view a three-dimensional image on the display panel 15 in the dual lens camera 2 only with his or her eyes without specialized eyewear.

Figure 3:
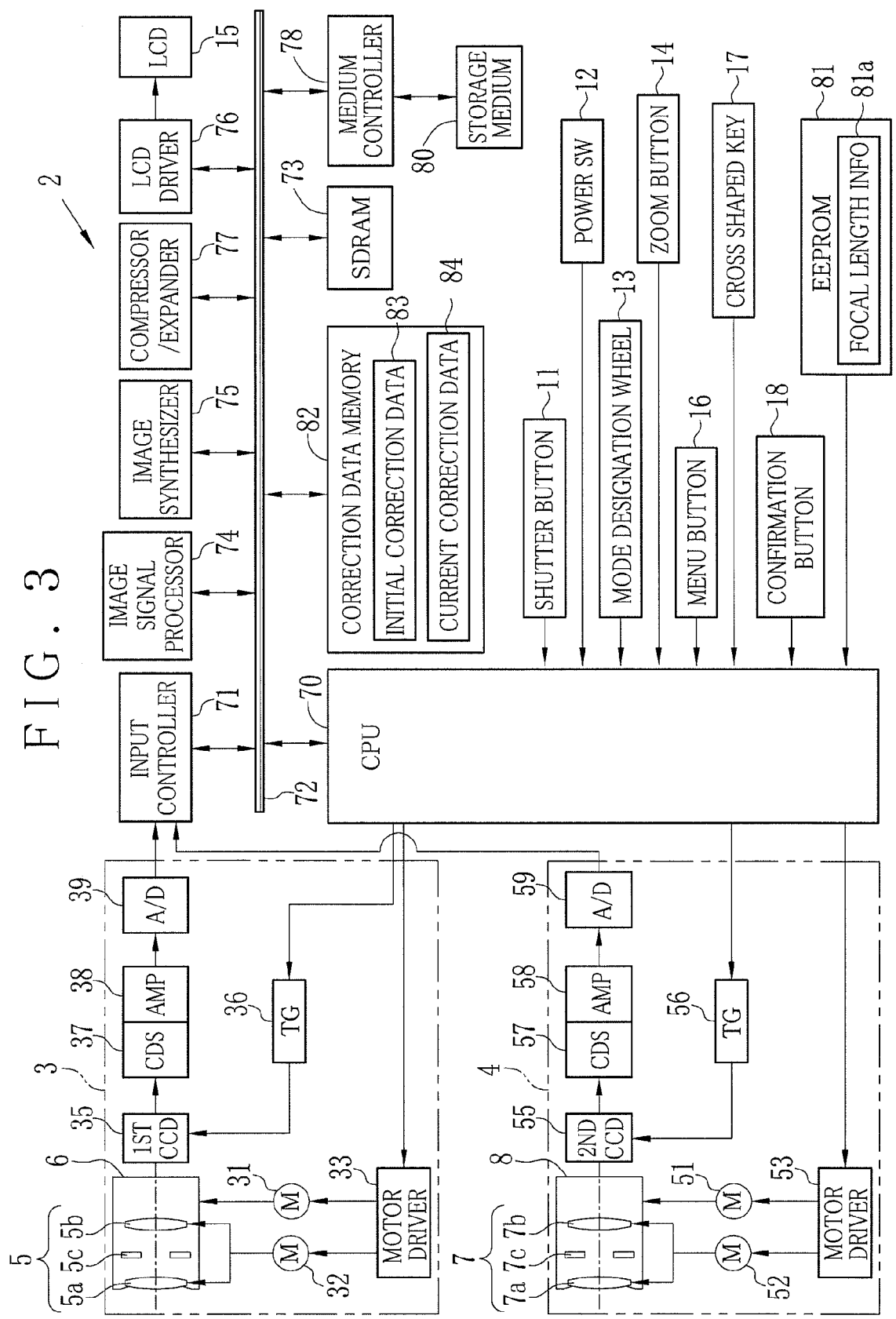
FIG. 3 is a block diagram schematically illustrating circuit elements in the dual lens camera.

In FIG. 3, the right camera unit 3 contains the first lens barrel 6, and also includes a first lens motor 31, a first focus motor 32 or driving motor, a first motor driver 33, a first CCD 35, a first timing generator 36 or TG, a first CDS 37 or correlated double sampling device, a first amplifier 38, and a first A/D converter 39.

The first lens system 5 includes a magnification lens 5a for zooming, a focus lens 5b and an aperture stop device 5c inside the first lens barrel 6. The first lens motor 31 rotates for moving the first lens barrel 6 forward to the forward position and moving the first lens barrel 6 backwards to the closed position. The first focus motor 32 rotates to move the magnification lens 5a and the focus lens 5b on the optical axis back and forth. The motors 31 and 32 are connected with the first motor driver 33. A CPU 70 as data processor and zoom control device sends a controls signal to the first motor driver 33, and drives the motors 31 and 32 to control the entirety of the dual lens camera 2.

The first CCD 35 is disposed behind the first lens system 5, which focuses object light from an object on an image pickup surface of the first CCD 35. The first CCD 35 is connected with the first timing generator 36. The first timing generator 36 is connected with the CPU 70, and caused by the CPU 70 to generate a timing signal or clock pulse to the first CCD 35. In response to the timing signal, the first CCD 35 picks up an object image of the object focused on the image pickup surface, and outputs an image signal of the image.

An image signal output by the first CCD 35 is input to the first CDS 37. In response, the first CDS 37 outputs image data of B, G and R colors exactly corresponding to a charge amount of stored charge in each of the cells in the first CCD 35. The image data output by the first CDS 37 is amplified by the first amplifier 38, and converted by the first A/D converter 39 into digital image data. The digital image data is output by the first A/D converter 39 as right eye image data. An input controller 71 is supplied by the image data.

In a manner similar to the right camera unit 3, the left camera unit 4 has the second lens barrel 8, and includes a second lens motor 51, a second focus motor 52 or driving motor, a second motor driver 53, a second CCD 55, a second timing generator 56 or TG, a second CDS 57 or correlated double sampling device, a second amplifier 58, and a second A/D converter 59. Those operate in the same manner as the elements in the right camera unit 3. When an image is picked up by the second CCD 55, an image signal is sent to the second CDS 57 and the second amplifier 58, and is converted into digital image data by the second A/D converter 59. The image data is output by the second A/D converter 59 to the input controller 71 by way of left eye image data.

There is a data bus 72 with which the input controller 71 is connected to the CPU 70. An SDRAM 73 is accessed by the input controller 71. The CPU 70 controls the input controller 71 to write image data from the right and left camera units 3 and 4 to the SDRAM 73. An image signal processor 74 reads image data from the SDRAM 73, and processes image data in various functions of the image processing, such as gradation conversion, white balance correction, and gamma correction.

The processed image data are written by the image signal processor 74 to the SDRAM 73 again.

An image synthesizer 75 or image registration processor or correction device reads image data from the SDRAM 73 after processing in the image signal processor 74. The image synthesizer 75 splits the image of the image data into a number of strip regions extending vertically, and synthesizes those by alternative arrangement, to obtain three-dimensional image data of a lenticular lens type for the display panel 15. The three-dimensional image data is written to the SDRAM 73.

An LCD driver 76 reads three-dimensional image data from the SDRAM 73, converts the same into an analog composite signal, and outputs the composite signal to the display panel 15. A three-dimensional image is displayed by the display panel 15 as a live image visible with eyes without specialized eyewear.

A compressor/expander 77 compresses the three-dimensional image data in a predetermined format of compression, for example, TIFF and JPEG. A removable storage medium 80 is set in a medium slot in a removable manner. A medium controller 78 accesses the storage medium 80, and reads the data from the storage medium 80 or writes the data to the storage medium 80 after the compression.

An EEPROM 81 is connected to the CPU 70. The EEPROM 81 stores various programs and data for controlling the dual lens camera 2. The CPU 70 runs programs read from the EEPROM 81, and controls circuit elements in the dual lens camera 2. The data stored in the EEPROM 81 include focal length information 81a in a form of a data table in which zoom positions of the magnification lens 5a and a magnification lens 7a for zooming are stored, and focal lengths corresponding to the zoom positions are stored. The CPU 70 refers to the focal length information 81a when each of the magnification lenses 5a and 7a is positioned in any of the zoom positions, and recognizes a focal length determined according to the zoom position.

The various elements are connected to the CPU 70, including the shutter button 11, the power switch 12, the mode designation wheel 13, the zoom button 14, the menu button 16, the cross shaped key 17 and the confirmation button 18. A user or operator can manually operate any of those, which inputs a control signal of the CPU 70. The shutter button 11 is a two step switch. When the shutter button 11 is depressed halfway, the CPU 70 operates for focus adjustment of the lens systems 5 and 7, exposure control, and other sequences for image pickup. When the shutter button 11 is depressed fully with a greater depth, an image signal of one frame of the right and left camera units 3 and 4 is converted into image signal.

The power switch 12 is a sliding type of switch. See FIG. 1. When the power switch 12 is moved to its ON position, a battery (not shown) supplies circuit elements with power, to start up the dual lens camera 2. When the power switch 12 is moved to its OFF position, supply of the power is discontinued to turn off the dual lens camera 2. The CPU 70, upon detecting a shift of the power switch 12 or the mode designation wheel 13, drives the first and second lens motors 31 and 51 to move the lens barrels 6 and 8 back and forth.

The CPU 70, in response to a signal from the zoom button 14, drives the first and second focus motors 32 and 52 to move the magnification lenses 5a and 7a back and forth along the optical axes. The magnification lenses 5a and 7a are set in one of plural zoom positions defined equidistantly between the wide-angle and telephoto end positions, to change the zoom magnification of the right and left camera units 3 and 4. Also, the CPU 70 drives the first and second focus motors 32 and 52 together to keep the magnification lenses 5a and 7a positioned equally in zooming.

A correction data memory 82 is connected to the data bus 72 for storing correction data for image registration of images obtained by the right and left camera units 3 and 4. The correction data memory 82 has an area for storing initial correction data 83 and one for current correction data 84 after adjustment. The initial correction data 83 is obtained in the inspection upon the manufacture. The current correction data 84 is determined by calibration in the calibration mode set by a user. An example of the correction data memory 82 is an EEPROM, flash memory or other types of non-volatile memories in which data are rewritable.

In FIG. 3, the initial correction data 83 and the current correction data 84 are stored in the correction data memory 82. However, the correction data memory 82 stores only the initial correction data 83 directly after the shipment from a factory and before carrying out a first calibration. In the calibration mode, the initial correction data 83 is utilized to obtain the current correction data 84 by its adjustment. Thus, the initial correction data 83 remains stored in the correction data memory 82 even after the current correction data 84 is obtained in the calibration mode. In contrast, the current correction data 84 is rewritten at each time of carrying out the calibration.

To produce three-dimensional image data from the plural image data, the image synthesizer 75 reads the initial correction data 83 or the current correction data 84 from the correction data memory 82, carries out image processing by use of those data for image registration between images even with unwanted deviation of the optical axes of the right and left camera units 3 and 4. When only the initial correction data 83 is stored in the correction data memory 82, the image synthesizer 75 reads the initial correction data 83 from the correction data memory 82 for the correction. This is effective in image registration between the images with the unwanted deviation of the optical axes of the right and left camera units 3 and 4 created in the course of manufacture due to errors in the sizes of parts or errors in assembly.

A user or operator performs calibration of the calibration mode to obtain the current correction data 84 when required, for example, if a shock occurs to the dual lens camera 2 to cause unwanted deviation of the optical axes of the right and left camera units 3 and 4. If the correction data memory 82 stores both of the initial correction data 83 and the current correction data 84, the image synthesizer 75 reads the current correction data 84 from the correction data memory 82 for performing correction. Thus, it is possible to correct misalignment between images due to accidental unwanted deviation of the optical axes of the right and left camera units 3 and 4 after the manufacture.

Figures 4, 5:
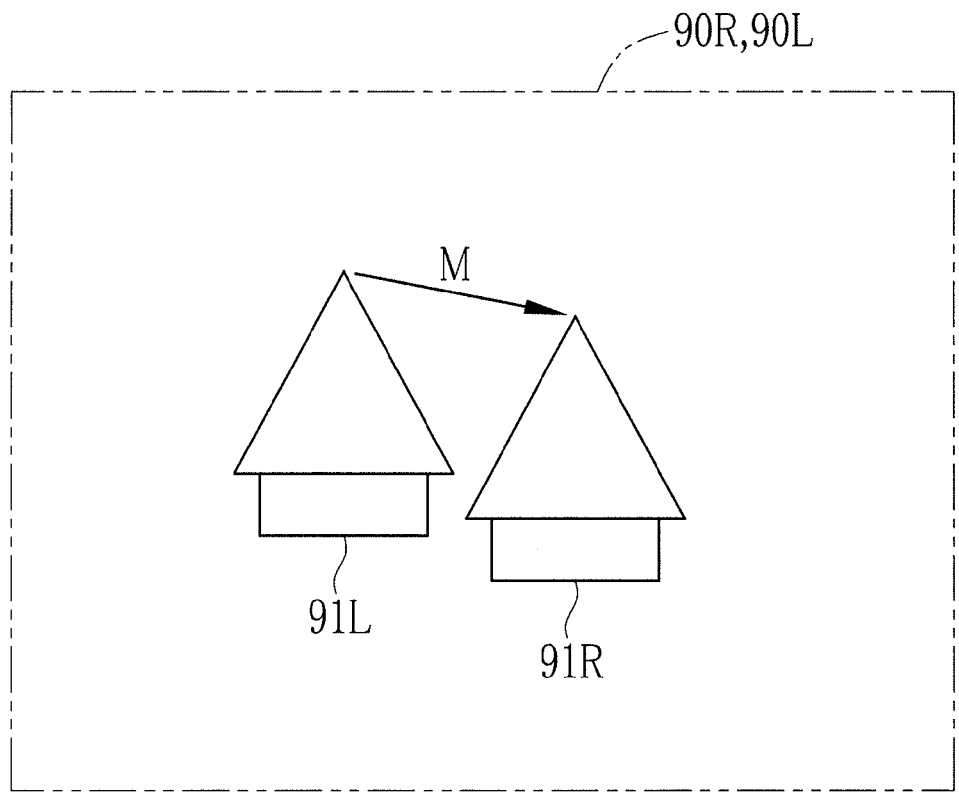
FIG. 4 is an explanatory view illustrating a vector.
FIG. 5 is a table illustrating correction data.

In FIG. 4, a left eye image 90L appears according to left eye image data. A right eye image 90R appears according to right eye image data. Each of the initial correction data 83 and the current correction data 84 is expressed by a vector M or displacement vector for representing an amount and direction of a shift of the right and left eye images 90L and 90R in a state superimposed on one another. When the right and left eye images 90L and 90R are shifted by the displacement vector M relatively, a common object 91R is registered with a common object 91L in the right and left eye images 90L and 90R. See FIG. 7. Misalignment between the right and left eye images 90L and 90R due to skew in the optical axes of the right and left camera units 3 and 4 is corrected.

A shifting amount and shifting direction of the right and left eye images 90L and 90R are different between the zoom positions (focal lengths) of the magnification lenses 5a and 7a. Thus, the displacement vector M is obtained for each one of the zoom positions of the magnification lenses 5a and 7a.

Each of the initial correction data 83 and the current correction data 84 is constituted by a data table in which the zoom positions of the magnification lenses 5a and 7a correspond to the displacement vector M. See FIG. 5.

Figure 6:
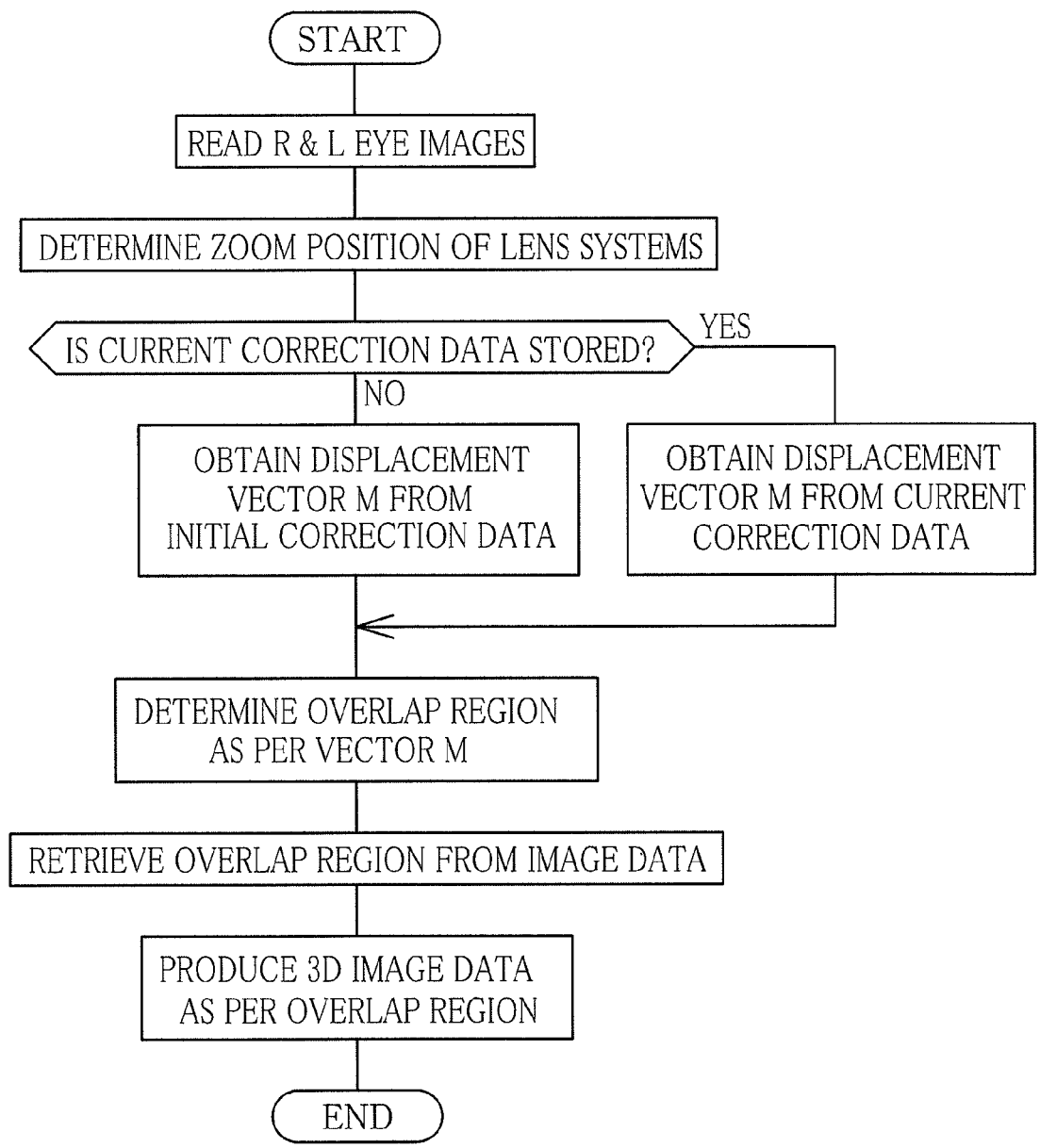
FIG. 6 is a flow chart illustrating a sequence of producing a three-dimensional image.

In FIG. 6, the operation of the image synthesizer 75 to produce three-dimensional image data is described now. When the CPU 70 generates an instruction signal to produce three-dimensional image data, the image synthesizer 75 reads right and left eye image data from the SDRAM 73. The image synthesizer 75 produces control information from the CPU 70 for the first and second motor drivers 33 and 53, and determines a zoom position of the magnification lenses 5a and 7a at the time of the recording of the image data.

When the zoom position is determined, the image synthesizer 75 accesses the correction data memory 82 to check whether the current correction data 84 is stored therein. Should the current correction data 84 not be stored, then the image synthesizer 75 obtains the displacement vector M from the initial correction data 83 according to the determined zoom position. Should the current correction data 84 be stored, then the image synthesizer 75 obtains the displacement vector M from the current correction data 84 according to the determined zoom position.

Figure 7A:
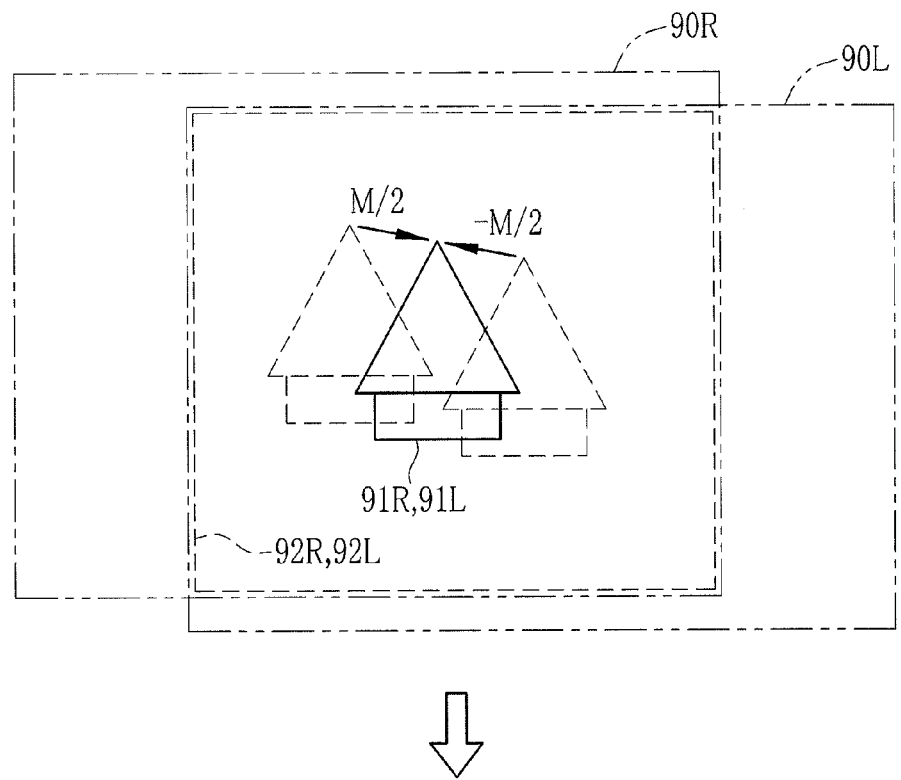
FIG. 7A is an explanatory view illustrating a state of images with misalignment before image registration.
Figure 7B:
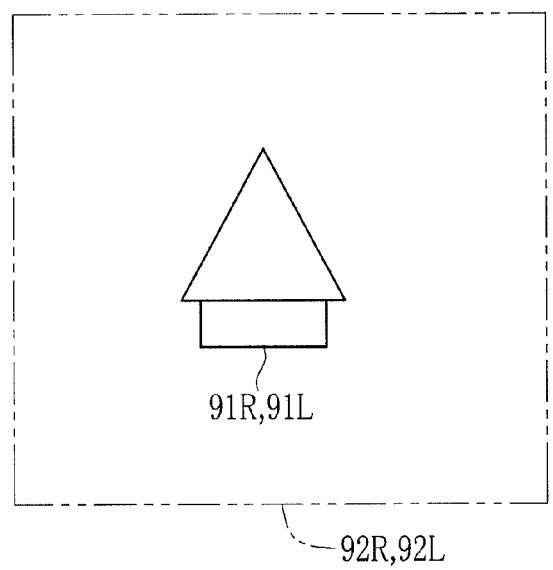
FIG. 7B is an explanatory view illustrating the same as FIG. 7A but after image registration.

When the image synthesizer 75 obtains the displacement vector M, the image synthesizer 75 determines an overlap region between the right and left eye image data according to the displacement vector M. In FIGS. 7A and 7B, the image synthesizer 75 shifts one of the right and left eye images 90L and 90R by an amount of M/2, and a remaining one of those by the amount of M/2 in an opposite direction. In an example of FIGS. 4, 7A and 7B, the displacement vector M is constituted with reference to the left eye image 90L. Thus, the left eye image 90L is shifted by the amount of M/2, and the right eye image 90R is shifted by the amount of −M/2. Overlap regions 92L and 92R are determined by the image synthesizer 75 from inside the right and left eye images 90L and 90R after the shift.

The image synthesizer 75, upon determining the overlap regions 92L and 92R, retrieves a portion of the overlap region 92R from the image of the right eye image data, and retrieves a portion of the overlap region 92L from the image of the left eye image data. Then the image synthesizer 75 produce three-dimensional image data of the lenticular lens type suitable for the display panel 15 according to the overlap regions 92L and 92R. Thus, the three-dimensional image data can have an acceptable form after image registration of the right and left eye images 90L and 90R.

Figure 8:
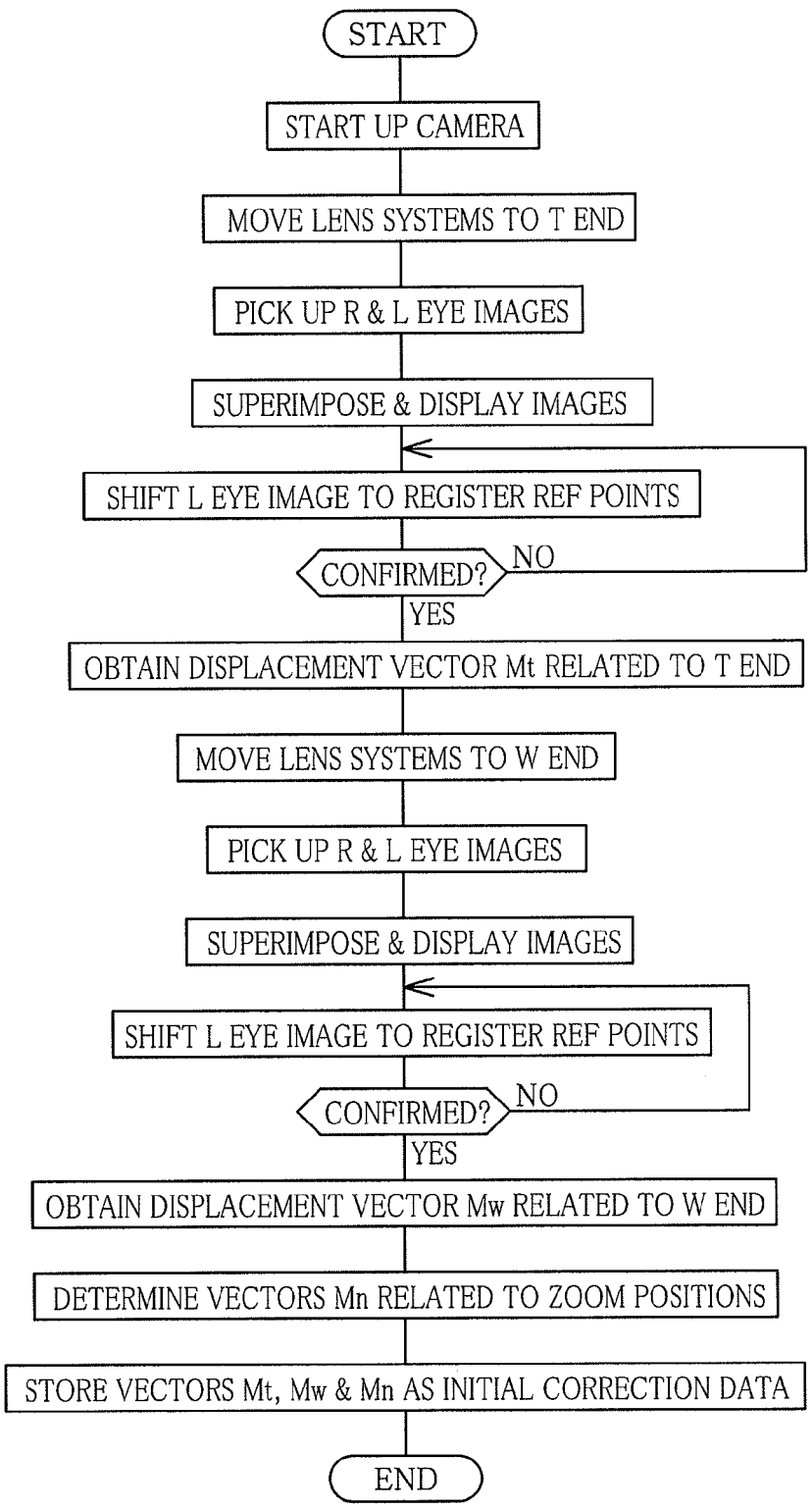
FIG. 8 is a flow chart illustrating a sequence of obtaining initial correction data.

In FIG. 8, a sequence of obtaining the initial correction data 83 is illustrated. As described above, the initial correction data 83 is obtained in the inspection after the manufacture. At first, an operator installs the dual lens camera 2 on a tripod or other special tool. A chart or other diagram is disposed at a predetermined distance corresponding to a telephoto end position of the right and left camera units 3 and 4 for correction to set up the dual lens camera 2. The operator operates the power switch 12 to turn on power to the dual lens camera 2.

The CPU 70 in the dual lens camera 2, when the power source is turned on without storing the initial correction data 83 in the correction data memory 82, is started up in a setup mode for obtaining the initial correction data 83. The CPU 70 in the setup mode sends control signals to the first and second motor drivers 33 and 53, drives the first and second focus motors 32 and 52, and moves the magnification lenses 5a and 7a to the telephoto end position.

The CPU 70 moves the magnification lenses 5a and 7a to their telephoto end position, and then records right and left eye image data, to cause the display panel 15 to display superimposed images according to the image data. See FIG. 4. The CPU 70 causes the image signal processor 74 to process the right and left eye images 90L and 90R in a translucent state by image processing. This makes it possible to recognize both the right and left eye images 90L and 90R even in the superimposed state. Note that the right and left eye images 90L and 90R may be live images or still images on the display panel 15.

The CPU 70, when the cross shaped key 17 is operated in the state of displaying the right and left eye images 90L and 90R in the superimposed state, shifts the left eye image 90L at a predetermined amount in a direction determined with the cross shaped key 17. The user or operator registers reference points with one another within the right and left eye images 90L and 90R by use of the cross shaped key 17, for image registration of the right and left eye images 90L and 90R in the telephoto end position.

A user, upon shifting the left eye image 90L to register the reference points, depresses the confirmation button 18. In response, the CPU 70 determines that the processing in the telephoto end position (positioning of the right and left eye images 90L and 90R) has been completed, and obtains a shifting amount and shifting direction of the shift of the left eye image 90L from the initial position as a displacement vector Mt of the telephoto end position.

The CPU 70, upon obtaining the displacement vector Mt, outputs a control signal to the first and second motor drivers 33 and 53, drives the first and second focus motors 32 and 52, and moves the magnification lenses 5a and 7a to the wide-angle end position. A displacement vector Mw of the wide-angle end position is obtained in a manner similar to the telephoto end position. Then the user, if required, shifts the reference points at a distance corresponding to the wide-angle end position of the right and left camera units 3 and 4.

When the displacement vector Mt of the telephoto end position and the displacement vector Mw of the wide-angle end position are obtained, the displacement vector Mn of intermediate zoom positions between those can be obtained from Equation (1).

$$Mn = Mt + [(Ft-Fn)/(Ft-Fw)] \times (Mw-Mt) \qquad \text{Equation (1)}$$

where Ft is a focal length of the lens system set in the telephoto end position, Fw is a focal length of the lens system set in the wide-angle end position, and Fn is a focal length of the lens system set in any zoom position n.

The CPU 70, upon obtaining the displacement vector Mw, reads the focal lengths Ft, Fw and Fn from an area of the focal length information 81a, and determines the displacement vector Mn of each of the zoom positions n according to Equation (1). The initial correction data 83 is constituted by the displacement vector Mt of the telephoto end position, the displacement vector Mw of the wide-angle end position, and the displacement vectors Mn of the zoom positions n, and is written to the correction data memory 82.

Thus, the initial correction data 83 is obtained. The initial correction data 83, as described above, are used to remove the misalignment by an inspector in the manufacture. The correction with the initial correction data 83 is effective in removing the misalignment of images with unwanted deviation of the optical axes of the right and left camera units 3 and 4. Complicated operation for producing the initial correction data can be reduced remarkably by only the above-described adjustment at the telephoto and wide-angle end positions and by calculating the displacement vectors Mn of intermediate zoom positions n between those.

Figure 9:
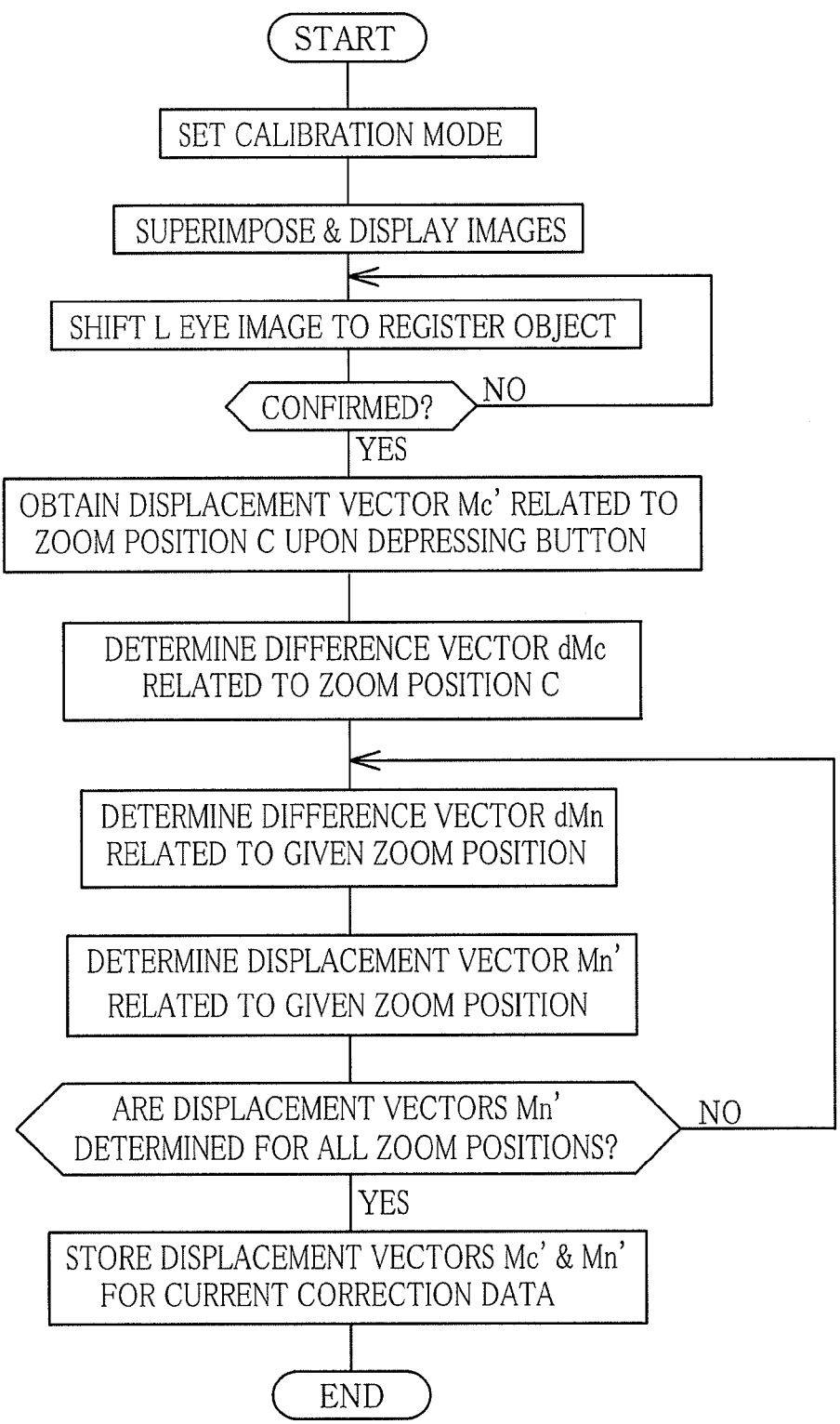
FIG. 9 is a flow chart illustrating a sequence of obtaining current correction data.

In FIG. 9, a sequence of steps in the calibration mode is described. In the case of occurrence of shock to the dual lens camera 2 to affect exactitude of the right and left camera units 3 and 4, a user or operator manually rotates the mode designation wheel 13 to set the calibration mode in the dual lens camera 2. The current correction data 84 is obtained.

The CPU 70 in the dual lens camera 2 causes the display panel 15 to display the right and left eye images 90L and 90R in a translucent state upon setting the calibration mode in a manner similar to the setup mode for the initial correction data. The CPU 70 is responsive to an input signal from the cross shaped key 17, and shifts the left eye image 90L at a predetermined amount according to the input signal.

When the right and left eye images 90L and 90R are displayed, he or she shifts the left eye image 90L by operating the cross shaped key 17 and registers the common object in the left eye image 90L exactly with that in the right eye image 90R for the image registration. To this end, the zoom button 14 is utilized to facilitating the registration. The zoom position of the magnification lenses 5a and 7a is adjusted with the zoom button 14 for changing a display size of the object as a target. Note that if the right and left eye images 90L and 90R are still images to be superimposed, it is possible to adjust the zoom position before the shutter release or before recording the still images.

When the left eye image 90L is shifted for registration of the common object, the user depresses the confirmation button 18. In response, the CPU 70 determines a zoom position C of the magnification lenses 5a and 7a according to the control information of the first and second motor drivers 33 and 53. After this, the CPU 70 obtains a shifting amount and shifting direction of shift of the left eye image 90L upon depression of the confirmation button 18 for a displacement vector Mc' (current displacement vector) after the calibration in the zoom position C.

Figure 10:
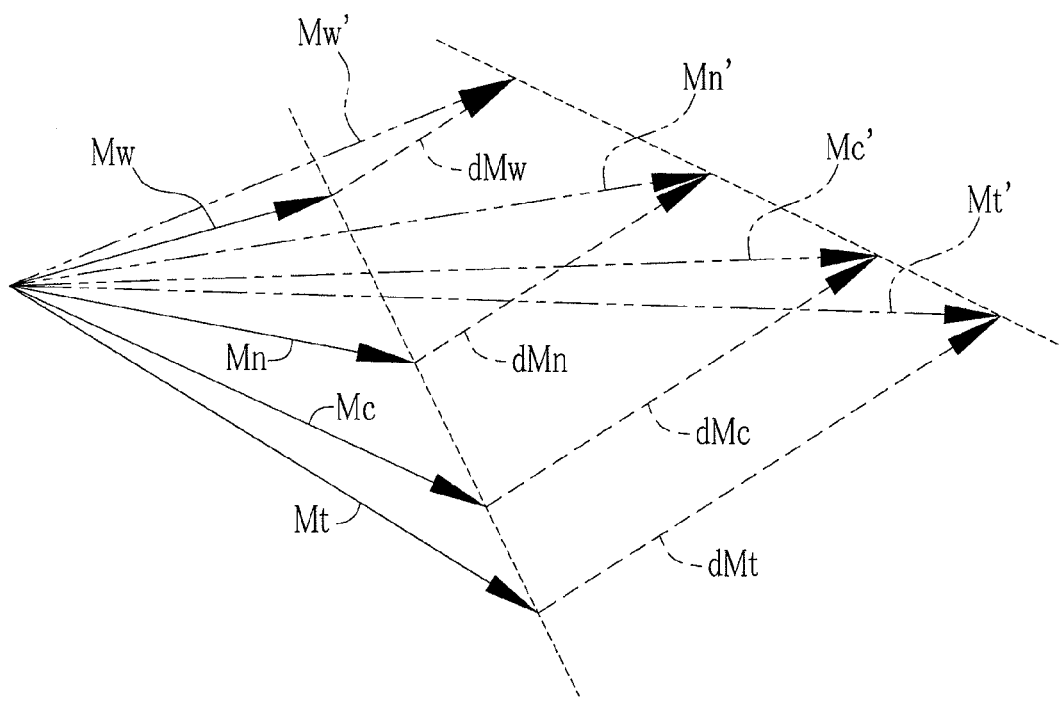
FIG. 10 is an explanatory view illustrating vectors at the time of obtaining the current correction data.

Upon obtaining the displacement vector Mc', the CPU 70 accesses the correction data memory 82 and reads an initial displacement vector Mc of the initial step of the zoom position C from the initial correction data 83. Then the CPU 70 determines a difference vector dMc as a difference amount (See FIG. 10) between the displacement vector Mc and the displacement vector Mc' after the calibration, according to Equation (2).

$$dMc = Mc' - Mc \quad \text{Equation (2)}$$

After determining the difference vector dMc of the zoom position C, the CPU 70 determines the difference vector dMn in a given zoom position n from a focal length Fc of the zoom position C and a focal length Fn of the given zoom position n as expressed in Equation (3).

$$dMn = Fn/Fc \times dMc \quad \text{Equation (3)}$$

The CPU 70, after obtaining the difference vector dMn, determines the displacement vector Mn' for a given zoom position n after the calibration according to a sum of the displacement vector Mn of the given zoom position N read from the initial correction data 83 and the determined difference vector dMn. Mn in Equation (4) is defined by Equation (1). dMn is defined by Equation (3). The displacement vector Mn' for the given zoom position n after the calibration can be determined from Equation (5), which is defined by rewriting Equation (4) with Equations (1) and (3).

$$Mn' = Mn + dMn \quad \text{Equation (4)}$$

$$Mn' = Mt + [(Ft-Fn)/(Ft-Fw)] \times (Mw-Mt) + Fn/Fc \times dMc \quad \text{Equation (5)}$$

The CPU 70 repeatedly calculates the displacement vector Mn' by changing the value of the zoom position, to obtain the displacement vector Mn' for all the zoom positions inclusive of the telephoto and wide-angle end positions after the calibration. The CPU 70 writes the initially obtained displacement vector Mc' and the displacement vector Mn' according thereto to the correction data memory 82 in the area of the current correction data 84. The CPU 70, if a previous set of the current correction data 84 is found stored in the correction data memory 82, deletes the previous set of the current correction data 84 and writes the new set of the current correction data 84 by overwriting.

Accordingly, the current correction data 84 is obtained. In short, the initial correction data 83 is adjusted again by the user or operator to obtain the current correction data 84. It is possible to correct misalignment between the images due to skew of the optical axes of the right and left camera units 3 and 4 after the manufacture by correction with the current correction data 84. As the adjustment of the initial correction data 83 is possible only by the adjustment in the single zoom position C. No adjustment for each of plural zoom positions determined with the right and left camera units 3 and 4 is required. Even an unfamiliar or unskilled user can readjust the initial correction data 83 easily.

Figure 11:
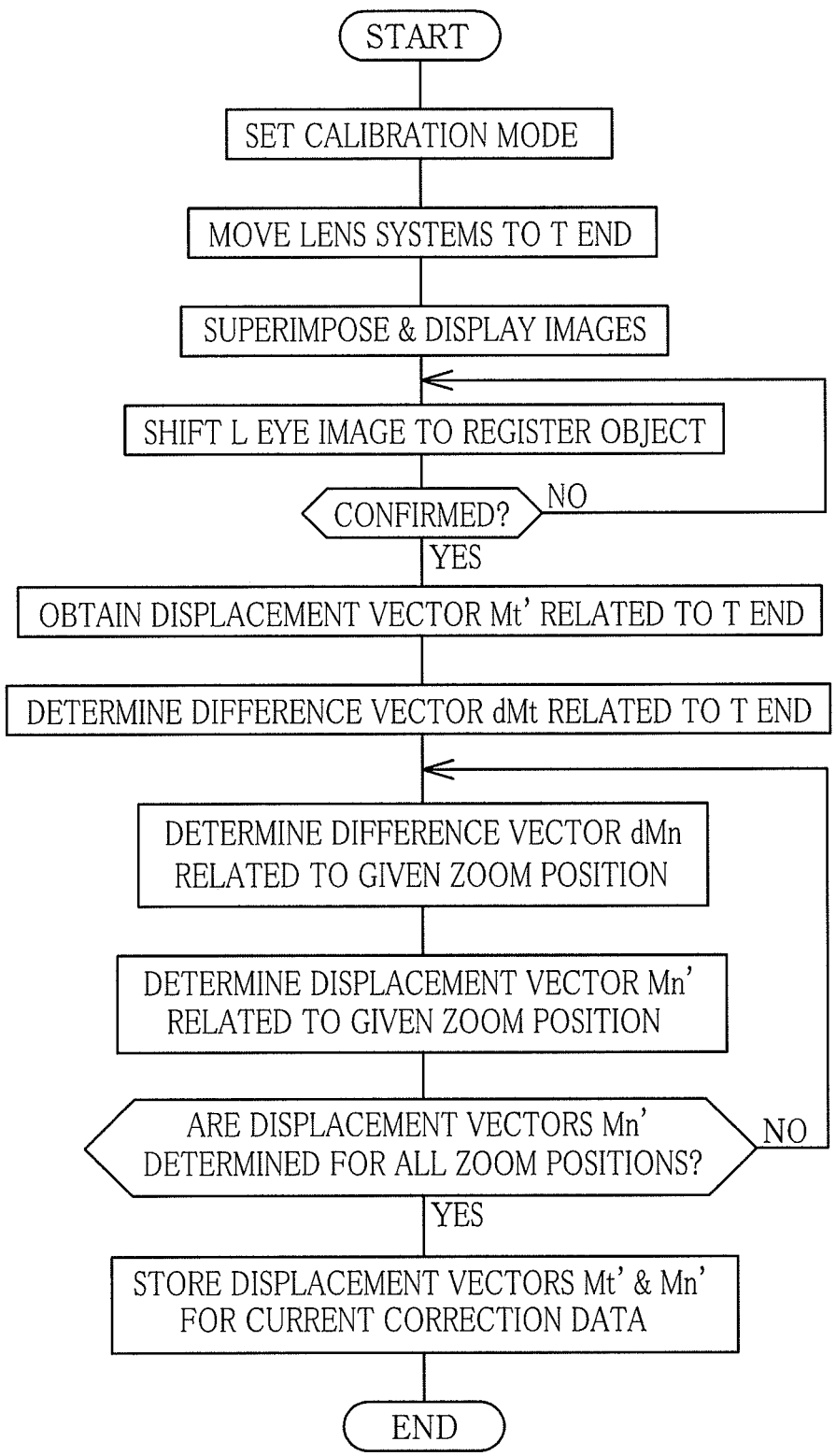
FIG. 11 is a flow chart illustrating a sequence of moving the lens systems to a telephoto end position upon setting of a calibration mode.

In the present embodiment, the user manually adjusts the zoom position of the magnification lenses 5a and 7a after the calibration mode is set. Furthermore, it is possible automatically to drive the first and second focus motors 32 and 52 in response to setting of the calibration mode according to a flow in FIG. 11. The magnification lenses 5a and 7a can be automatically moved to their telephoto end position.

Misalignment of the right and left eye images 90L and 90R due to skew of the optical axes of the right and left camera units 3 and 4 is the most remarkable when the magnification lenses 5a and 7a are set in the telephoto end position. Thus, the right and left eye images 90L and 90R are aligned in a state of automatically setting the magnification lenses 5a and 7a in the telephoto end position. This is effective in obtaining the current correction data 84 with considerably high precision by suppressing the misalignment between the right and left eye images 90L and 90R and removing errors in determining the displacement vector Mn'.

It is possible to shift one of the right and left eye images 90L and 90R toward the other by an amount of the displacement vector M instead of shifting of the right and left eye images 90L and 90R by the amount of M/2 to correct their misalignment.

The misalignment of the right and left eye images 90L and 90R in a horizontal direction does not influence remarkably in consideration of easy stereoscopy of a three-dimensional image. In the above embodiment, the misalignment in the vertical and horizontal directions between the right and left eye images 90L and 90R is corrected. However, it is possible only to correct misalignment in the vertical direction between the right and left eye images 90L and 90R by use of a vertical component of the displacement vector M.

It is also possible to shift the right eye image 90R in place of the left eye image 90L for the purpose of obtaining the initial correction data 83 and the current correction data 84 by use of the cross shaped key 17. In the above embodiments, the right and left eye images 90L and 90R are registered with one another by manual operation. However, correction of misalignment can be automatic. For example, a pattern recognition technique known in the art is used to derive an image portion of a reference point from pixels of the right and left eye images 90L and 90R. The right and left eye images 90L and 90R can be registered by image processing according to the reference point.

In the above embodiment, the memory for initial correction data and the memory for current correction data after the adjustment are combined in a single element of the correction data memory 82. However, a memory for current correction data after the adjustment can be separate from a memory for initial correction data.

In the embodiments, the autostereoscopic system is the lenticular lens type. The lenticular lens is disposed on a surface of the display panel 15. However, a parallax barrier type can be used in the invention. To this end, a three-dimensional display panel is constituted by the display panel 15 and a parallax barrier, to produce three-dimensional image data of the parallax barrier type. Also, a stereoscopic system of the invention may be a type with a polarized filter eyewear or specialized eyewear for viewing according to a polarization display type of three-dimensional image data.

In the above embodiment, the dual lens camera 2 has the right and left camera units 3 and 4. However, the number of camera units combined in a camera array can be three or more in a multi-lens camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A multi-lens camera for producing a three-dimensional image from plural images with parallax, comprising:
   plural lens systems for receiving entry of object light to form said plural images;
   a zoom mechanism for changing a magnification of each of said lens systems within a zooming range;
   a first correction data memory for storing initial correction data constituted by a displacement vector of an amount and a direction of misalignment between said plural images according to a superimposed state thereof for each of zoom positions of said lens systems;
   a mode designation device for setting a calibration mode for adjusting said initial correction data;
   a vector detector for, if said calibration mode is set, obtaining a current displacement vector between said plural images in relation to one first zoom position;
   a data processor for outputting current correction data by adjusting said initial correction data according to said initial correction data and said current displacement vector;
   a second correction data memory for storing said current correction data;
   an image registration processor for, if said current correction data is absent in said second correction data memory, obtaining a displacement vector from said initial correction data according to a zoom position of said lens systems upon forming said plural images, and if said current correction data is stored in said second correction data memory, obtaining a displacement vector from said current correction data according to a zoom position of said lens systems upon forming said plural images, to carry out image registration between the plural images according to said obtained displacement vectors for producing said three-dimensional image.

2. A multi-lens camera as defined in claim 1, wherein said data processor obtains said displacement vector in association with said first zoom position from said initial correction data, to constitute an initial displacement vector, determines a first difference amount between said initial displacement vector and a current displacement vector, determines a second difference amount in association with one second zoom position according to said first difference amount and a ratio between focal lengths in relation to respectively said first and second zoom positions, obtains a second initial displacement vector in association with said second zoom position from said initial correction data, and determines a sum of said second difference amount and said second initial displacement vector, to constitute said current correction data in relation to said second zoom position.

3. A multi-lens camera as defined in claim 1, further comprising a zoom control device for driving said zoom mechanism in response to setting of said calibration mode, to set said lens systems in a telephoto end position for a zoom position.

4. A multi-lens camera as defined in claim 1, wherein said image registration processor determines an overlap region where said plural images overlap on one another according to said obtained displacement vector, for said image registration by retrieving said overlap region from said plural images.

5. A multi-lens camera as defined in claim 4, further comprising a display panel for displaying said plural images in said superimposed state;
   wherein said vector detector is externally operable to input a signal for shifting one of said plural images in one direction;
   an amount and direction of shift of a shifted image are determined for a current displacement vector upon registering a common object in said plural images on said display panel.

6. A multi-lens camera as defined in claim 4, wherein said second correction data memory is accessed to rewrite said current correction data determined newly at each time of setting said calibration mode.

7. A control method of controlling a multi-lens camera including plural lens systems for receiving entry of object light to form plural images with parallax, and a zoom mechanism for changing a magnification of each of said lens systems within a zooming range, so as to produce a three-dimensional image from said plural images, comprising steps of:
   obtaining a displacement vector of an amount and a direction of misalignment between said plural images according to a superimposed state thereof for each of zoom positions of said lens systems, to store initial correction data;
   if a calibration mode is set for adjusting said initial correction data, obtaining a current displacement vector between said plural images in relation to one first zoom position;
   outputting current correction data by adjusting said initial correction data according to said initial correction data and said current displacement vector;
   writing said current correction data to a correction data memory;
   if said current correction data is absent in said correction data memory, obtaining a displacement vector from said initial correction data according to a zoom position of said lens systems upon forming said plural images, and if said current correction data is stored in said correction data memory, obtaining a displacement vector from said current correction data according to a zoom position of said lens systems upon forming said plural images, to carry out image registration between said plural images according to the obtained displacement vectors for producing said three-dimensional image.

8. A control method as defined in claim 7, wherein said step of outputting said current correction data includes:

obtaining said displacement vector in association with said first zoom position from said initial correction data, to constitute an initial displacement vector;

determining a first difference amount between said initial displacement vector and said current displacement vector;

determining a second difference amount in association with one second zoom position according to said first difference amount and a ratio between focal lengths in relation to respectively said first and second zoom positions;

obtaining a second initial displacement vector in association with said second zoom position from said initial correction data; and determining a sum of said second difference amount and said second initial displacement vector, to constitute said current correction data in relation to said second zoom position.

9. A control method as defined in claim 7, further comprising a step of driving said zoom mechanism in response to setting of said calibration mode, to set said lens systems in a telephoto end position for a zoom position.

10. A control method as defined in claim 7, wherein said step of said image registration includes:

determining an overlap region where said plural images overlap on one another according to said obtained displacement vector; and carrying out said image registration by retrieving said overlap region from said plural images.

11. A control method as defined in claim 10, wherein said step of initially obtaining said displacement vector includes:

obtaining displacement vectors of said lens systems when said lens systems are set in a telephoto end position and a wide-angle end position; and obtaining a displacement vector in relation to one intermediate zoom position according to said displacement vectors in relation to said telephoto and wide-angle end positions and ratios between focal lengths of optical systems in said telephoto and wide-angle end positions and said intermediate zoom position thereof.

* * * * *